(12) United States Patent
Wiik et al.

(10) Patent No.: US 11,292,419 B2
(45) Date of Patent: Apr. 5, 2022

(54) AIRBAG MODULE

(71) Applicant: Joyson Safety Systems Acquisition LLC, Auburn Hills, MI (US)

(72) Inventors: Richard Wiik, Oakland Township, MI (US); Ryan Fecteau, Auburn Hills, MI (US)

(73) Assignee: Joyson Safety System Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/137,265

(22) Filed: Dec. 29, 2020

(65) Prior Publication Data

US 2021/0197749 A1  Jul. 1, 2021

Related U.S. Application Data

(60) Provisional application No. 62/955,588, filed on Dec. 31, 2019.

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | |
|---|---|---|---|
| 8,282,126 B2 * | 10/2012 | Wiik ................. | B60R 21/23138 280/730.2 |
| 9,016,718 B2 * | 4/2015 | Fukawatase ...... | B60R 21/23138 280/730.2 |
| 10,343,638 B2 * | 7/2019 | Fukawatase ...... | B60R 21/23138 |
| 2020/0189513 A1 * | 6/2020 | Volkmann ............. | B60R 21/207 |
| 2021/0170978 A1 * | 6/2021 | Acker ..................... | B60R 21/23 |
| 2021/0268987 A1 * | 9/2021 | Choi .................... | B60R 21/2338 |

FOREIGN PATENT DOCUMENTS

| | | | | |
|---|---|---|---|---|
| EP | 3643566 A1 * | 4/2020 | ........... | B60R 21/207 |
| JP | 2014069729 A * | 4/2014 | ....... | B60R 21/23138 |
| WO | WO-2019073826 A1 * | 4/2019 | ........... | B60R 21/233 |

* cited by examiner

*Primary Examiner* — Faye M Fleming
(74) *Attorney, Agent, or Firm* — Gordon Rees Scully Mansukhani, LLP (57) ABSTRACT

An airbag module for protecting an occupant of a vehicle seat. The module includes an inflatable cushion and an inflator. The cushion is configured to inflate into a position inboard of the vehicle seat and includes a first inflatable chamber fluidly connected to a second inflatable chamber. The cushion is configured to inflate into a position in which the first inflatable chamber is in a position to absorb energy resulting from relative movement of the torso of the occupant in a direction lateral to the longitudinal axis of the vehicle. The second inflatable chamber is configured to inflate into a position to absorb energy resulting from relative movement of the head of the occupant.

20 Claims, 6 Drawing Sheets

AIRBAG MODULE

CROSS-REFERENCE TO RELATED APPLICATIONS

This application claims priority to and the benefit of U.S. Provisional Application No. 62/955,588 filed on Dec. 31, 2019. The foregoing provisional application is incorporated by reference herein in its entirety.

GENERAL DESCRIPTION

The present disclosure relates generally to the field of airbags and occupant protection systems. More specifically, the disclosure relates to an airbag module that includes an airbag, such as a center side impact airbag (CSIAB).

A vehicle, such as an automobile, generally includes airbag modules to provide safety for the vehicle's occupants. Airbag modules generally include a stored airbag or cushion and an inflator. The modules may be located in a position to deploy into the passenger compartment of a vehicle in order to protect the occupant during a crash event. The airbag may include various inflatable chambers to ensure that the airbag provides one or more desirable protective features such as appropriate cushioning, ejection mitigation, and energy absorption. In particular, a CSIAB is configured to deploy into a position to dampen the energy associated with the displacement of the occupant in the inboard direction in the event of a vehicle side impact and to transfer the load of the occupant to the seat frame. The center side impact airbag is also referred to as a far side airbag (FSAB). An outboard mounted side airbag is also referred to as a near side airbag.

Current CSIAB provide some level of reduction in the lateral travel of the head and body of the occupant. However, with increased safety requirements overall cushion geometry and volume may increase, which may increase the overall package volume and cost. The disclosed embodiments provide a cushion for head support to reduce lateral rotation of the neck without significantly increasing the overall cushion shape.

SUMMARY

Various embodiments of an improved airbag module are disclosed herein. According to one disclosed embodiment, an airbag module for protecting an occupant of a vehicle seat includes an inflatable cushion and an inflator for providing an inflation gas for the cushion. The cushion is configured to inflate into a position inboard of the vehicle seat and includes a first inflatable chamber fluidly connected to a second inflatable chamber. The cushion is configured to inflate into a position in which the first inflatable chamber is in a position to absorb energy resulting from relative movement of the torso of the occupant in a direction lateral to the longitudinal axis of the vehicle. The second inflatable chamber is configured to inflate into a position to absorb energy resulting from relative movement of the head of the occupant. The second inflatable chamber is positioned laterally towards the occupant relative to the first inflatable chamber.

The second inflatable chamber may be positioned inboard from the perimeter of the inflatable cushion. The second inflatable chamber is positioned to inflate into a position closer to the occupant than the first inflatable chamber. The first and second inflatable chambers are fluidly connected by a passage. The passage may be located above, below, or adjacent to the second inflatable chamber. The second inflatable chamber may be configured to pivot relative to a vertical or a horizontal axis.

According to another disclosed embodiment, an airbag module for protecting an occupant of a vehicle seat is provided that includes an inflatable cushion and an inflator for providing an inflation gas for the cushion. The cushion is configured to inflate into a position inboard of the vehicle seat and includes a first inflatable chamber fluidly connected to a second inflatable chamber. The cushion is configured to inflate into a position in which the first inflatable chamber is in a position to absorb energy resulting from relative movement of the torso of the occupant in a direction lateral to the longitudinal axis of the vehicle. The second inflatable chamber is surrounded by the first inflatable chamber and is configured to inflate into a position laterally towards the occupant from the first inflatable chamber to thereby absorb energy resulting from relative movement of the head of the occupant.

The second inflatable chamber may pivot along a substantially vertical axis to move toward the occupant. Alternatively, the second inflatable chamber may pivot along a substantially horizontal axis to move toward the occupant. The first and second inflatable chambers may be fluidly connected through a passage that permits inflation gas to move in a substantially horizontal direction. Alternatively, the passage may be configured to allow inflation gas to move substantially downward toward the floor of the vehicle or substantially upward toward the ceiling of the vehicle. The airbag may include a sail panel that covers the second inflatable chamber and is positioned so that the second inflatable chamber is located between the sail panel and the seat.

According to yet another disclosed embodiment, an airbag module for protecting an occupant of a vehicle seat is provided. The airbag module includes an inflatable cushion and an inflator for providing an inflation gas for the cushion. The cushion includes first and second inflatable chambers and is configured to inflate into a position inboard of the vehicle seat. The first inflatable chamber is configured to inflate into a position to absorb energy resulting from relative movement of the torso of the occupant in a direction lateral to the longitudinal axis of the vehicle. The second inflatable chamber is configured to inflate into a position laterally towards the occupant from the first inflatable chamber to thereby absorb energy resulting from relative movement of the head of the occupant. The first inflatable chamber is larger than the second inflatable chamber and surrounds the second inflatable chamber. The first and second inflatable chambers are fluidly connected by a passage for inflation gas. The perimeter of the second inflatable chamber is not connected to the first inflatable chamber except for along the flow passage.

The airbag may include a sail panel that covers a side of the second inflatable chamber opposite to the occupant to thereby urge the second inflatable chamber to pivot towards the occupant upon inflation. The second inflatable chamber may be configured to pivot along a substantially vertical axis to move toward the occupant. Alternatively, the second inflatable chamber may be configured to pivot along a substantially horizontal axis to more toward the occupant. The passage may be configured to direct inflation gas to move in a substantially horizontal direction. Alternatively, the passage may be configured to direct inflation gas to move in a direction substantially downward towards the floor of the vehicle or substantially upward towards the ceiling of the vehicle. In any of the disclosed embodiments, the airbag may include a non-inflatable region surrounded by the first inflatable chamber.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one disclosed exemplary embodiment, an airbag module is provided for protecting an occupant of a vehicle seat. The airbag module includes an inflatable cushion, and an inflator for providing inflation gas for the cushion. The cushion is configured to inflate into a position inboard of the vehicle seat and includes a first inflatable chamber fluidly connected to a second inflatable chamber. The cushion is configured to inflate into a position in which the first inflatable chamber is in a position to absorb energy resulting from relative movement of the torso of the occupant in a direction lateral to the longitudinal axis of the vehicle, and wherein the second inflatable chamber is configured to inflate into a position to absorb energy resulting from relative movement of the head of the occupant. The second inflatable chamber is positioned laterally towards the occupant relative to the first inflatable chamber.

According to one embodiment, the second chamber pivots along a vertical axis generally extending from the bottom to the top of the vehicle.

According to another embodiment, the second chamber pivots along a horizontal axis generally extending from the front to the rear of the vehicle.

Figure 1:
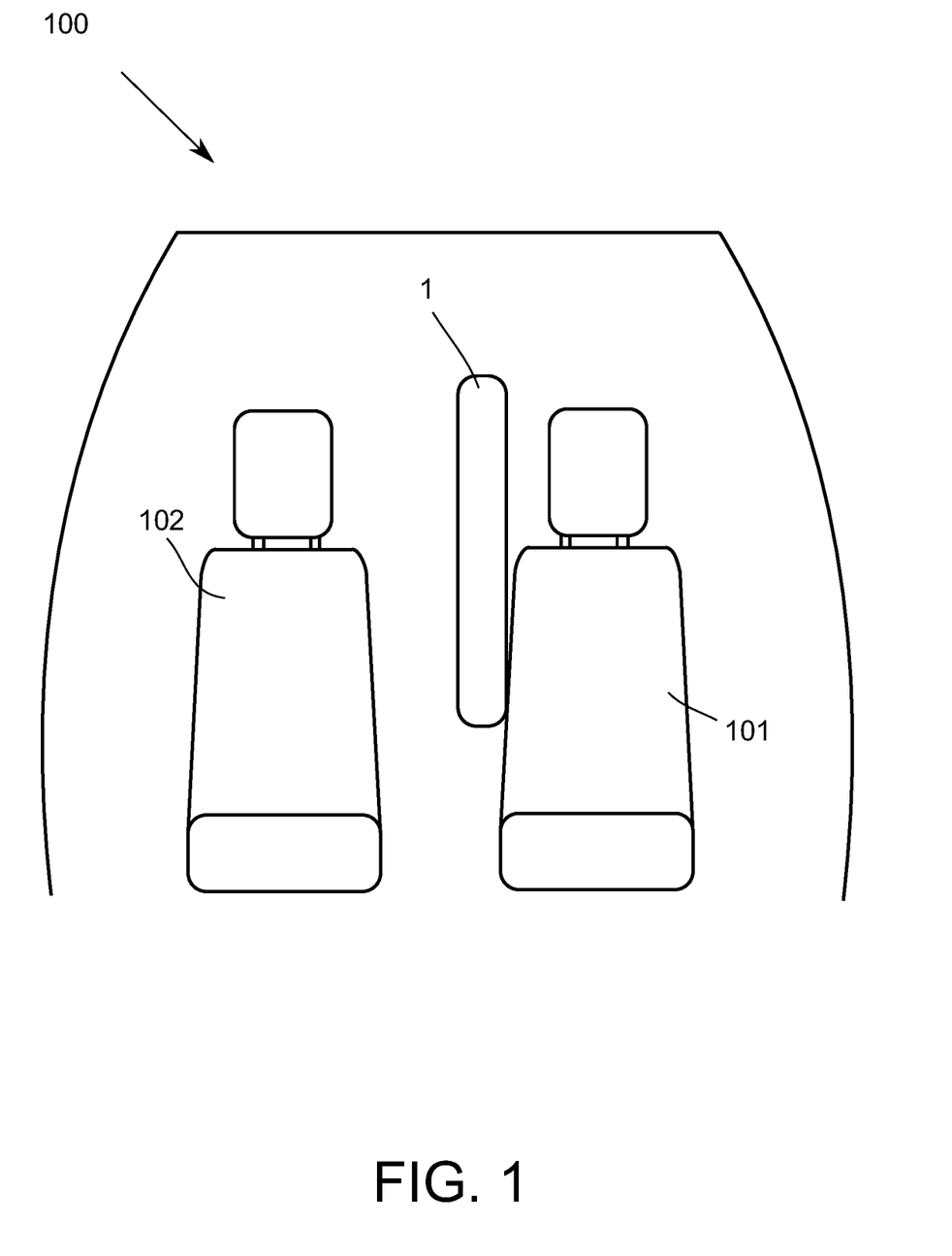
FIG. 1 is a diagram of a vehicle with an exemplary center side impact airbag.

FIG. 1 illustrates a front view of a driver's seat 101 and a passenger seat 102 of a vehicle 100. An exemplary far side airbag or center side impact airbag cushion 1 is shown to be deployed during a far side impact. The location of the cushion 1 may vary and may also be implemented onto the passenger seat 102. Only a simplified schematic of the cushion 1 is shown. Exemplary embodiments of cushion 1 will be described below.

Figure 2A:
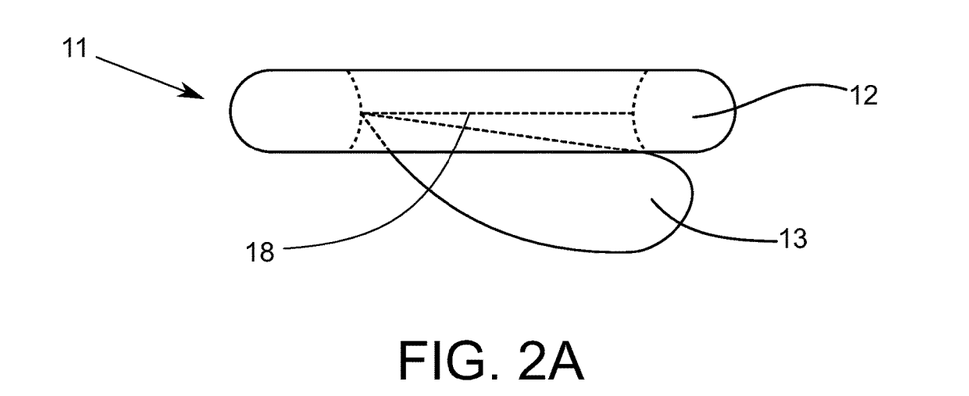
FIG. 2A is a top view of a cushion of an exemplary center side impact airbag according to a first embodiment.
Figure 2B:
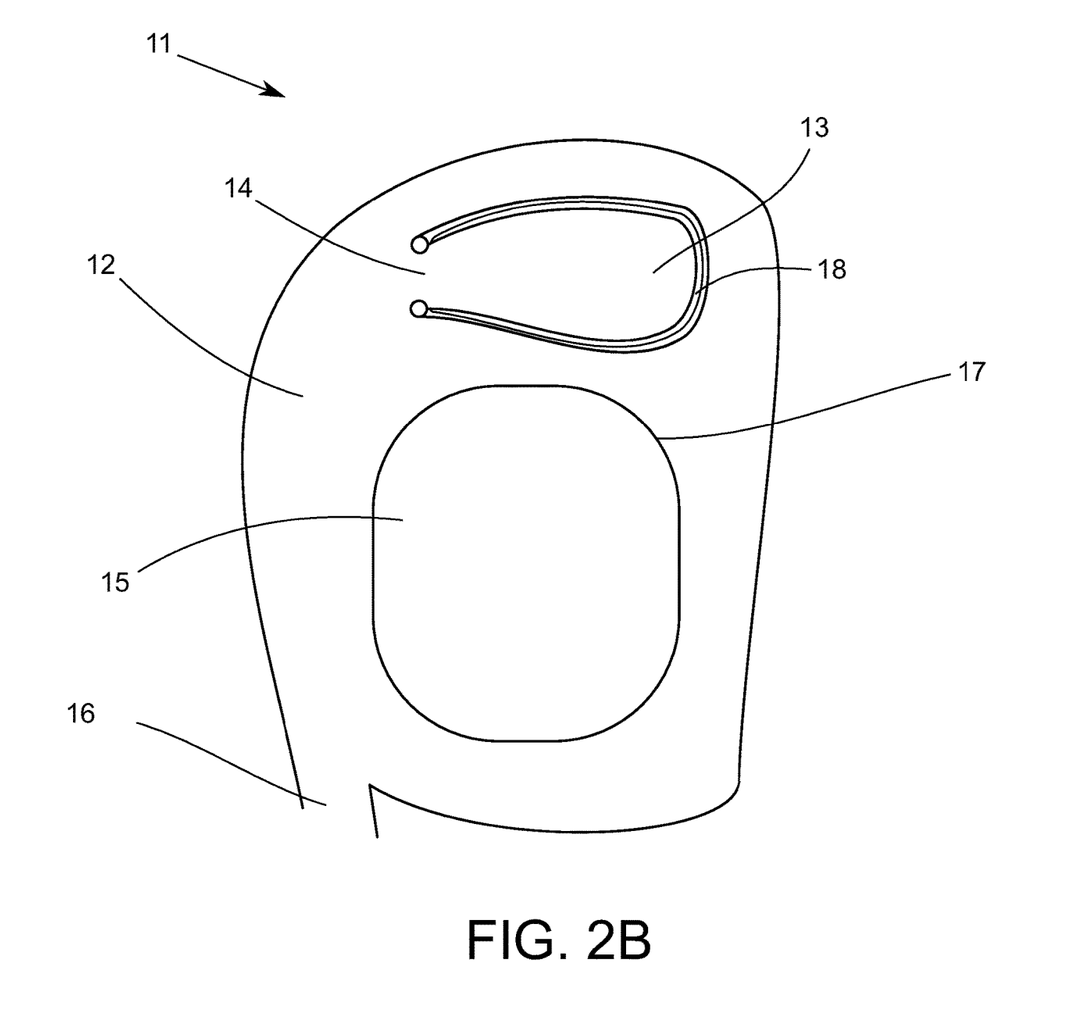
FIG. 2B is a side view of a cushion of an exemplary center side impact airbag of FIG. 2A.

FIGS. 2A and 2B show a first exemplary embodiment of a cushion 11. The airbag cushion 11 includes a first or main chamber 12 and a second or secondary chamber 13 generally disposed radially inwards (towards the occupant) relative to the first chamber 12 and in fluid communication with the first chamber 12 via a relatively narrow passage 14 (e.g. orifice, control opening, vent, etc.). When the airbag cushion is deployed, inflation gases from an inflator (not shown) initially fills the first chamber 12 from inlet 16. The first chamber is positioned and is configured to be contacted by the torso of an occupant of the vehicle. The first chamber forms a high pressure, rigid structure that is configured to provide lateral restraint and to resist bending. A closed seam 17 surrounds an unfilled or non-inflated region 15 that may be disposed on the cushion. This non-inflated region 15 generally aligns with and receives the upper torso and shoulder of the occupant. The first chamber 12 generally surrounds the unfilled region 15. The second chamber 13 is generally provided above the non-inflated region 15 and located above the occupants shoulder. As shown in the various embodiments disclosed herein, the second chamber is generally surrounded by the first chamber.

The airbag cushion 11 is configured such that inflation gases from the inflator pass from the first chamber 12 through the passage 14 to inflate a second chamber 13 in a generally horizontal direction. While only a single passage 14 is shown, other embodiments may contain multiple passages providing a path to the second chamber 13. The second chamber 13 is configured to provide head support to the occupant to reduce the rotation of the neck to reduce head excursion and neck injury. The second chamber 13 may be pivoted relative to the first chamber 12 in order to reach a position on the occupant's shoulder. The second chamber 13 may pivot laterally towards the occupant relative to a vertical axis. The vertical axis may generally extend in a direction up and down relative to the passenger (e.g., generally extending in a direction from the bottom of the vehicle to the top of the vehicle). The second chamber 13 is positioned closer to the passenger relative to the first chamber 12. The lateral offset of the second chamber 13 allows the second chamber 13 to make contact with the occupant's head earlier after a dynamic vehicle impact event and provides additional separation of the occupant's head and an adjacent occupant, thereby reducing the opportunity for contact in a far side collision event. The second chamber 13 may also inflate slower or later than the first chamber 12. This delay in deployment allows the second chamber 13 to better accommodate the delay of the occupant's head rotation in a far side impact event. As shown in FIG. 2B, the cushion 11 may be relatively compact in size due to the radially inwards location of the second chamber 13 relative the first chamber 12. Thus, the cushion or airbag 11 requires little to no increase to the cushion perimeter when compared to conventional far side airbags. The occupant as recited in this disclosure is referring to the occupant sitting closest to the cushion (e.g., occupant sitting on seat 101 as shown in FIG. 1. closest to cushion 1).

A separate deployment direction panel (e.g., a sail panel) 18 may be positioned adjacent the second chamber 13. The sail panel 18 directs the deployment of the second chamber to pivot relative to the first chamber by, for example, providing a reaction surface for the inflating second chamber 13. The sail panel 18 may be integrated with the airbag so that the sail panel region may be constructed from one or more of the panels forming the boundaries for the first inflatable chamber. The sail panel may be considered a second non-inflatable region of the airbag 11 and preferably covers or overlies the entire second chamber 13.

Figure 3A:
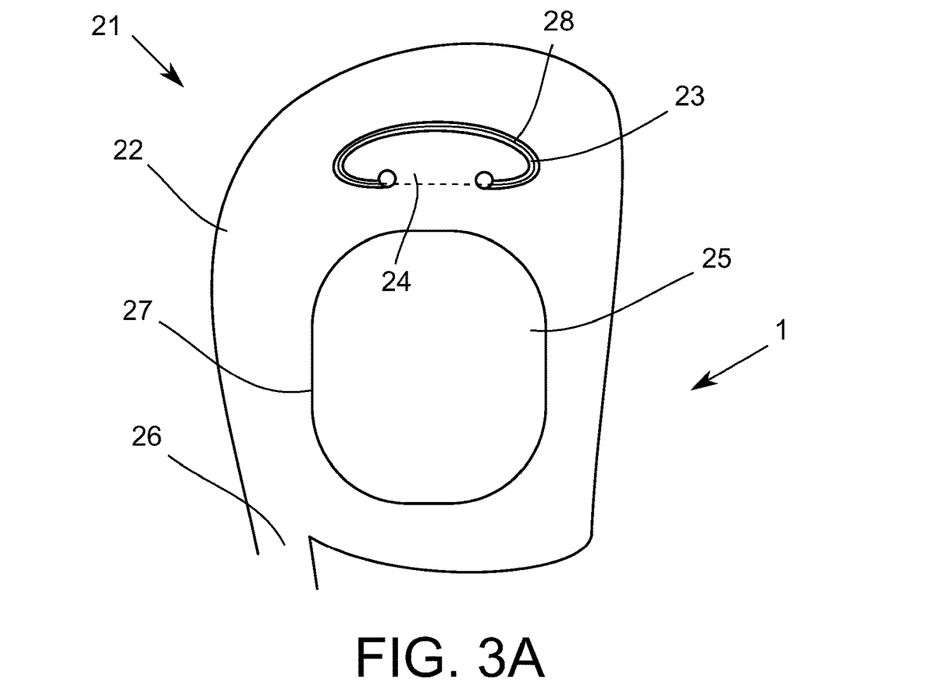
FIG. 3A is a side view of a cushion of an exemplary center side impact airbag according to a second embodiment.
Figure 3B:
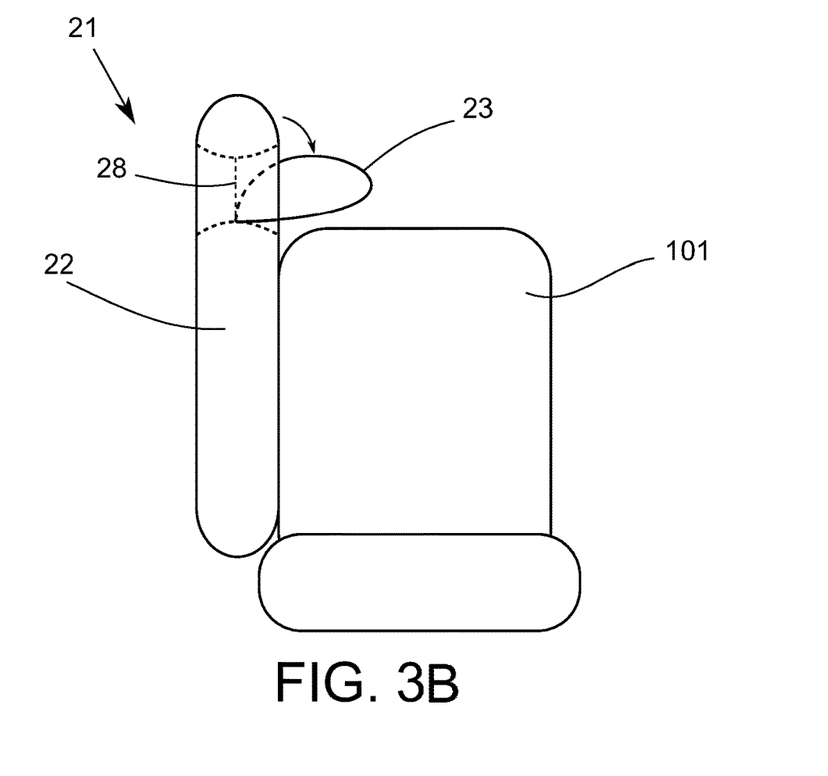
FIG. 3B is a front view of a cushion of an exemplary center side impact airbag of FIG. 3A.

FIGS. 3A and 3B show a second exemplary embodiment of a cushion 21. The airbag cushion 21 includes a first or main chamber 22 and a second or secondary chamber 23 generally disposed radially inwards relative to the first chamber 22 and in fluid communication with the first chamber 22 via a relatively narrow passage 24 (e.g. orifice, control opening, vent, etc.). When the airbag cushion is deployed, inflation gases from an inflator (not shown) initially fills the first chamber 22 from inlet 26. The first chamber is positioned and is configured to be contacted by the torso of an occupant of the vehicle. The first chamber forms a high pressure, rigid structure that is configured to provide lateral restraint and to resist bending. A closed seam 27 surrounds an unfilled or non-inflated region 25 that may be disposed on the cushion. This unfilled region 25 generally aligns with and receives the upper torso and shoulder of the occupant. The first chamber 22 generally surrounds the non-inflated region 25. The second chamber 23 is generally provided above the non-inflated region 25 and located above the occupants shoulder.

The airbag cushion is configured such that inflation gases from the inflator pass from the first chamber 22 through the passage 24 to inflate a second chamber 23. While only a single passage 24 is shown, other embodiments may contain multiple passages providing a path to the second chamber 23. The second chamber 23 is configured to provide head support to the occupant to reduce the rotation of the neck. The second chamber 23 may be pivoted towards the occupant relative to the first chamber 22 such that it configured to be positioned onto the occupant's shoulder.

According to this exemplary embodiment, the second chamber 23 is disposed such that the inflator gas fills the second chamber 23 by flowing in an upward direction. The passage 24 is disposed below the second chamber 23. The second chamber 23 may be pivoted laterally towards the occupant relative to a horizontal axis and down towards the seat 101 of the occupant. FIG. 3B shows the relative pivot of the second chamber 23 from the first chamber 22 towards the occupant seat 101. The horizontal axis may generally be extending forward and aft relative to the passenger (e.g. generally from the front of the vehicle to the rear of the vehicle). The second chamber 23 is positioned closer to the passenger relative to the first chamber 22. The lateral offset of the second chamber 23 allows the second chamber 23 to catch the occupant's head earlier and allows to help provide separation of the far side occupant's head and near side occupant's head, reducing the opportunity for contact in a far side collision event. The second chamber 23 may also be inflated later or after the first chamber 22. This delay in deployment allows the second chamber 23 to better accommodate the delay of the occupant's head rotation in the case of a far side impact involving the vehicle. As shown in FIG. 3A, the cushion 21 may be relatively compact in size due to the radially inwards location of the second chamber 23 relative the first chamber 22. Thus, the cushion or airbag 21 requires little to no increase to the cushion perimeter when compared to conventional far side airbags.

A separate deployment direction panel (e.g., a sail panel) 28 may be positioned adjacent the second chamber 23. The sail panel 28 directs the deployment of the second chamber to pivot relative to the first chamber by, for example, providing a reaction surface for the inflating second chamber 23. The sail panel 28 may be integrated with the airbag so that the sail panel region may be constructed from one or more of the panels forming the boundaries for the first inflatable chamber. The sail panel may be considered a second non-inflatable region of the airbag 21 and preferably covers or overlies the entire second chamber 23.

Figure 4A:
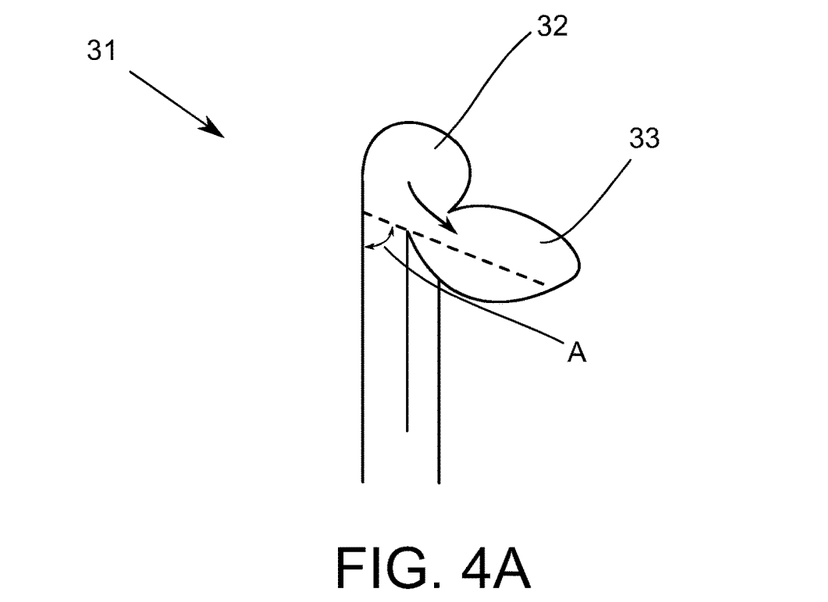
FIG. 4A is a front view of a cushion of an exemplary center side impact airbag according to a third embodiment.
Figure 4B:
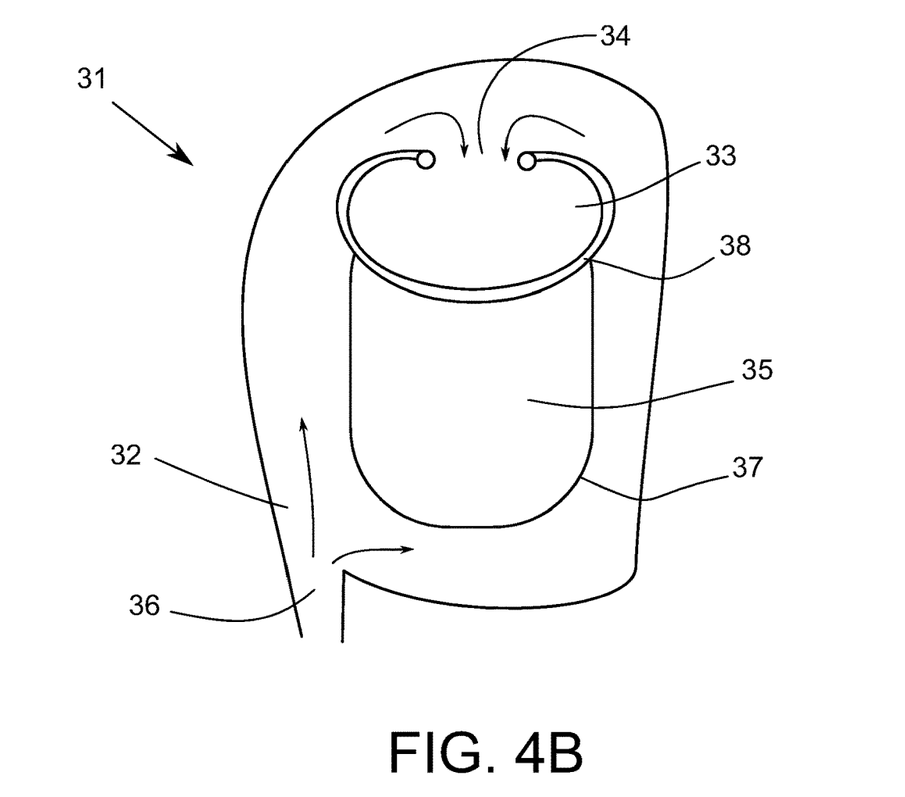
FIG. 4B is a side view of a cushion of an exemplary center side impact airbag of FIG. 4A.

FIGS. 4A and 4B show a third exemplary embodiment of a cushion 31. The airbag cushion 31 includes a first or main chamber 32 and a second or secondary chamber 33 generally disposed radially inwards relative to the first chamber 32 and in fluid communication with the first chamber 32 via a relatively narrow passage 34 (e.g. orifice, control opening, vent, etc.). When the airbag cushion is deployed, inflation gases from an inflator (not shown) initially fills the first chamber 32 from inlet 36. The first chamber is positioned and is configured to be contacted by the torso of an occupant of the vehicle. The first chamber forms a high pressure, rigid structure that is configured to provide lateral restraint and to resist bending. A closed seam 37 surrounds an unfilled region 35 that may be disposed on the cushion. This unfilled region 35 generally aligns with and receives the upper torso and shoulder of the occupant. The first chamber 32 generally surrounds the unfilled region 35. The second chamber 33 is generally provided above the unfilled region 35 and located above the occupants shoulder. Line 'A' shown in FIG. 4A represents the inclination of the secondary chamber 33 relative to a vertical line. The angle formed by the line 'A' represents the amount the secondary chamber 33 is rotated upwards towards the occupant.

The airbag cushion 31 is configured such that inflation gases from the inflator pass from the first chamber 32 through the passage 34 to inflate a second chamber 33. While only a single passage 34 is shown, other embodiments may contain multiple passages providing a path to the second chamber 33. The second chamber 33 is configured to provide head support to the occupant to reduce the rotation of the neck to reduce head excursion and neck injury. The second chamber 33 may be pivoted relative to the first chamber 32 such that it configured to be positioned onto the occupant's shoulder.

In this embodiment second chamber 33 is disposed such that the inflator fills the second chamber 33 downwards. The passage 34 is disposed above the second chamber 33. The second chamber 33 may be pivoted laterally away from the first chamber 32 towards the occupant relative to a horizontal axis. The horizontal axis may generally be extending forward and aft relative to the passenger (e.g. generally from the front of the vehicle to the rear of the vehicle).

A separate deployment direction panel (e.g., a sail panel) 38 may be positioned adjacent the second chamber 33. The sail panel 38 directs the deployment of the second chamber 33 to pivot relative to the first chamber 32 by, for example, providing a reaction surface for the inflating second chamber 33. The second chamber 33 is positioned closer to the passenger relative to the first chamber 32. The lateral offset of the second chamber 33 allows the second chamber 33 to catch the occupant's head earlier and allows to help provide separation of the far side occupant's head and near side occupant's head, reducing the opportunity for contact in a far side collision event. The sail panel 38 may be integrated with the unfilled or non-inflated region 35 of the airbag 31.

The second chamber 33 may also be inflated at a different speed (e.g. later) relative to the first chamber 32. This delay in deployment allows the second chamber 33 to better accommodate the delay of the occupant's head rotation due to a far side impact. This configuration allows the cushion 31 to be of a relatively compact shape due to the radially inwards location of the second chamber 33 relative to the first chamber 32, thus not requiring any significant increase to the cushion perimeter.

Figure 5:
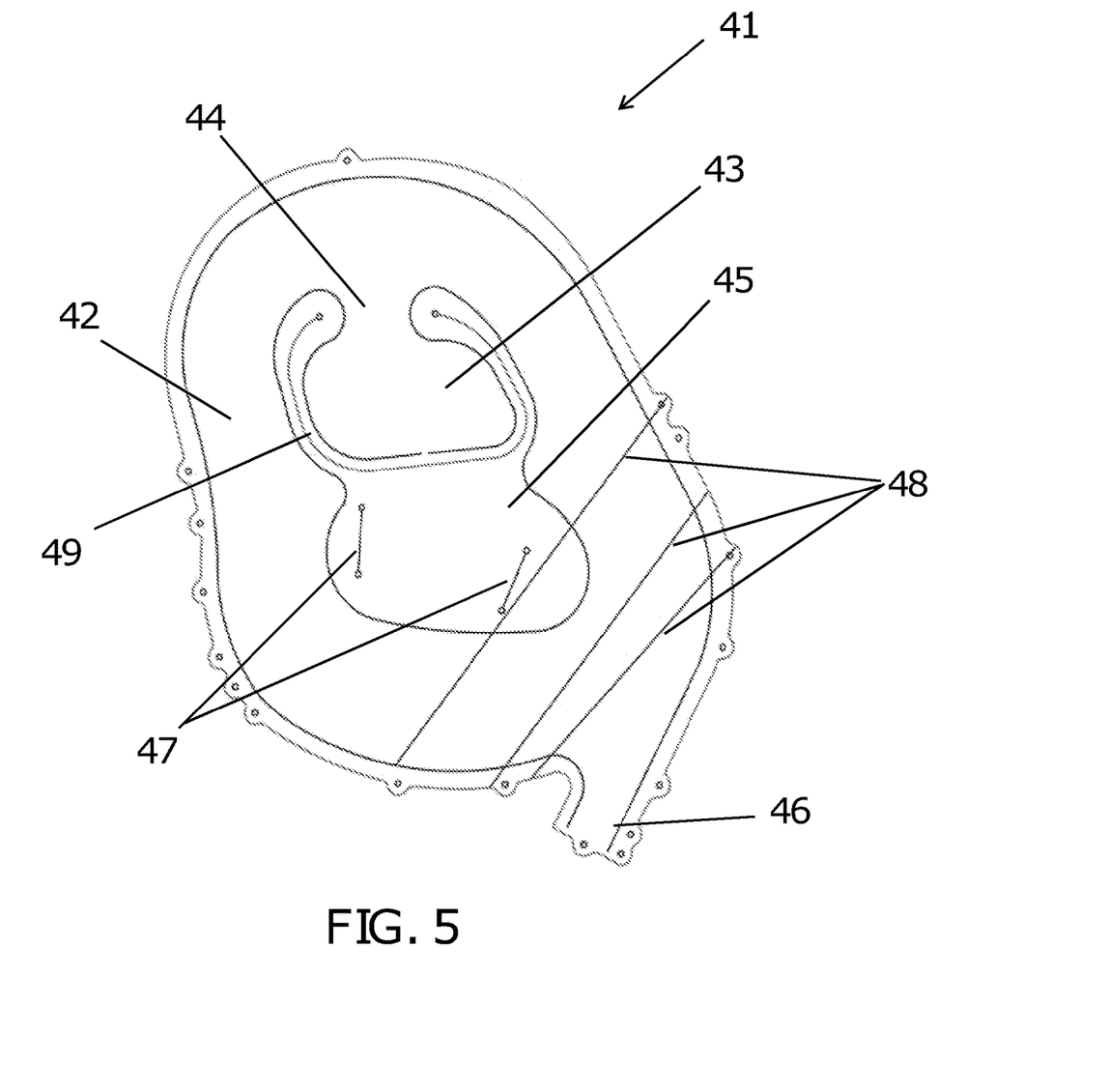
FIG. 5 is a side view of a cushion of an exemplary center side impact airbag according to a fourth embodiment.
Figure 6A:
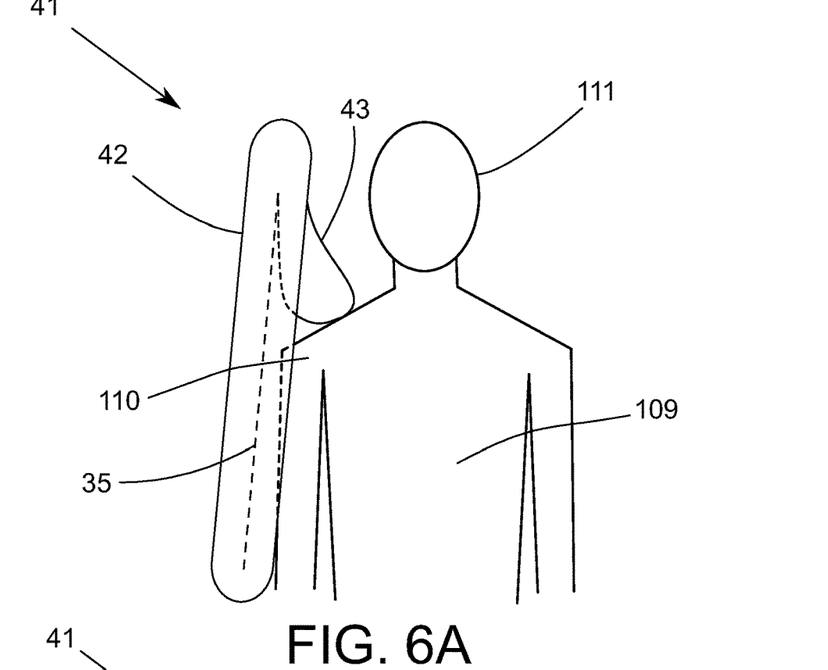
FIG. 6A is a front view of a cushion of an exemplary center side impact airbag according to a fourth embodiment with a passenger.
Figure 6B:
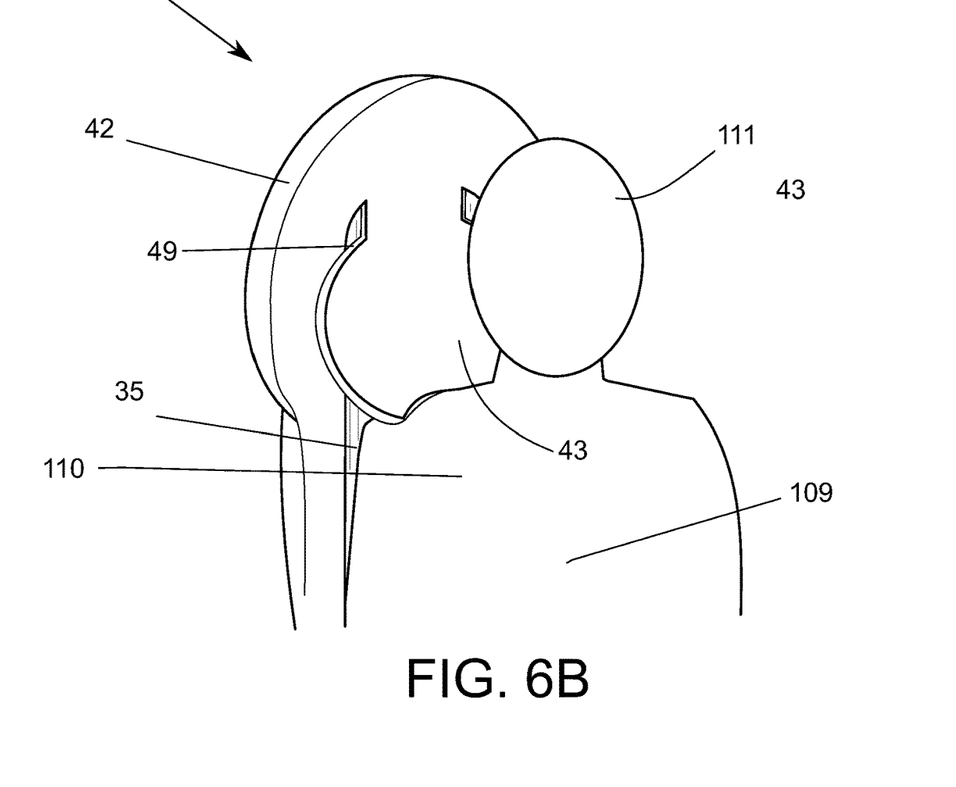
FIG. 6B is a front view of a cushion of an exemplary center side impact airbag according to a fourth embodiment with a passenger.

FIGS. 5, 6A, and 6B show a fourth exemplary embodiment of a cushion 41 that is similar to the embodiment shown in FIGS. 4A and 4B. The airbag cushion 41 includes a first or main chamber 42 and a second or secondary chamber 43 generally disposed radially inwards relative to the first chamber 42 and in fluid communication of first chamber 42 via a relatively narrow passage 44 (e.g. orifice, control opening, vent, etc.). When the airbag cushion is deployed, inflation gases from an inflator (not shown) initially fills the first chamber 42 from inlet 46. The first chamber is positioned and is configured to be contacted by the torso of an occupant of the vehicle. The first chamber forms a high pressure, rigid structure that is configured to provide lateral restraint and to resist bending. Slots 47 may be provided in a non-inflated region 45. This non-inflated region 45 generally aligns with and receives the upper torso and shoulder of the occupant. The first chamber 42 generally surrounds the unfilled region 45. The second chamber 43 is generally provided above the unfilled region 45 and configured to be disposed above the occupant's shoulder 110 when inflated as shown in FIGS. 6A and 6B. Tethers 48, may be disposed on the cushion 41 in order for the cushion shape to be held and maintained when inflated. For example, the tethers 48 may be provided to ensure the front of the cushion maintains its position relative to the occupant and the cushion stays generally parallel to the seat.

The airbag cushion 41 is configured such that inflation gases from the inflator pass from the first chamber 42 through the passage 44 to inflate a second chamber 43. While only a single passage 44 is shown, other embodiments may contain multiple passages providing a path to the second chamber 43. The second chamber 43 is configured to provide head support to the occupant to reduce the rotation of the neck to reduce head excursion and neck injury. The second chamber 43 may be pivoted relative to the first chamber 42 such that it configured to be positioned onto the occupant's shoulder.

In this embodiment the second chamber 43 is disposed such that the inflation gas fills the second chamber 43 downwards toward the floor of the vehicle. The passage 44 is disposed above the second chamber 43. The second chamber 43 may be pivoted laterally away from the first chamber 42 towards the occupant relative to a horizontal axis. The horizontal axis may generally be extending forward and aft relative to the passenger (e.g. generally from the front of the vehicle to the rear of the vehicle). The second chamber 43 may be positioned closer to the passenger relative to the first chamber 42. The lateral offset of the second chamber 43 allows the second chamber 43 to catch the occupant's head earlier and allows to help provide separation of the far side occupant's head and near side occupant's head, reducing the opportunity for contact in a far side collision event. The second chamber 43 may also be inflated slower and later than the first chamber 42. This delay in deployment allows the second chamber 43 to better accommodate the delay of the occupant's head rotation due to a far side impact event involving the vehicle. This configuration allows the cushion 41 to be of a relatively compact shape due to the radially inwards location of the second chamber 43 relative to the first chamber 42, thus not requiring any significant increase to the cushion perimeter.

As described above with regard to FIGS. 2B, 3A and 4B, in the embodiment shown in FIGS. 5, 6A and 6B a separate deployment direction panel (e.g., a sail panel) 49 may be positioned adjacent the second chamber 43. The sail panel 49 directs the deployment of the second chamber to pivot relative to the first chamber by, for example, providing a reaction surface for the inflating second chamber 43. Unfilled region 45 may comprise the sail panel 49 in this embodiment.

FIGS. 6A and 6B shows occupant 109, occupant head 111, and occupant shoulder 110. When the cushion 41 is inflated, the unfilled region 45 is configured to be adjacent to the shoulder 110 of the occupant 109. The second chamber 43 is placed above the occupant's shoulder 110 in order to catch the occupant's head 111 when a far side force is imparted to the vehicle. During a far side event, the occupant's head 111 will turn towards the second chamber 43 of the cushion 41. The second chamber 43 of the cushion 41 will reduce the lateral excursion and lateral rotation of the head 111.

The disclosed embodiments show a sail panel (18, 28, 38, 49) for directing the deployment of the second chamber of the airbag. The size and shape of the sail panel may be varied in order to ensure that the second chamber pivots as desired. For example, the sail panel may be large enough to overlie a portion of the inflated first chamber. Also, alternative structures and configurations may be employed to direct the pivot and deployment of the second chamber of the airbag. For example, one or more tethers may be provided for "pulling" the second chamber into position relative the first chamber. Also, the second chamber may be configured to have dimensions that overlie a portion of the first chamber so that the second chamber naturally pivots and deploys to a position overlapping and adjacent to the first chamber.

In summary, an airbag device is provided with an improved occupant head rotation and excursion during far side impacts.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIG- URES. It should be noted that the orientation of various elements may differ according to other exemplary embodiments, and that such variations are intended to be encompassed by the present disclosure.

It is important to note that the construction and arrangement of the airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An airbag module for protecting an occupant of a vehicle seat, the airbag module comprising:
    an inflatable cushion;
    an inflator for providing an inflation gas for the cushion;
    wherein the cushion is configured to inflate into a position inboard of the vehicle seat and includes a first inflatable chamber fluidly connected to a second inflatable chamber, wherein the second inflatable chamber is located internal to the perimeter of the cushion;
    wherein the cushion is configured to inflate into a position in which the first inflatable chamber is in a position to absorb energy resulting from relative movement of the torso of the occupant in a direction lateral to the longitudinal axis of the vehicle, and wherein the second inflatable chamber is configured to inflate into a position to absorb energy resulting from relative movement of the head of the occupant;
    wherein the second inflatable chamber is positioned laterally towards the occupant relative to the first inflatable chamber.

2. The airbag module of claim 1, wherein the second inflatable chamber is surrounded by the first inflatable chamber.

3. The airbag module of claim 2, wherein the second inflatable chamber is configured to inflate into a position closer to the occupant of the seat than the first inflatable chamber.

4. The airbag module of claim 1, wherein the first and second inflatable chambers are fluidly connected by a passage.

5. The airbag module of claim 4, wherein the passage is located below the second inflatable chamber.

6. The airbag module of claim 4, wherein the passage is located above the second inflatable chamber.

7. The airbag module of claim 1, wherein the second inflatable chamber pivots relative to a vertical axis.

8. An airbag module for protecting an occupant of a vehicle seat, the airbag module comprising:
    an inflatable cushion;
    an inflator for providing an inflation gas for the cushion;
    wherein the cushion is configured to inflate into a position inboard of the vehicle seat and includes a first inflatable chamber fluidly connected to a second inflatable chamber;
    wherein the cushion is configured to inflate into a position in which the first inflatable chamber is in a position to absorb energy resulting from relative movement of the torso of the occupant in a direction lateral to the longitudinal axis of the vehicle, and
    wherein the second inflatable chamber is surrounded by the first inflatable chamber and is configured to inflate into a position laterally towards the occupant from the first inflatable chamber to thereby absorb energy resulting from relative movement of the head of the occupant.

9. The airbag module of claim 8, wherein the second inflatable chamber pivots along a substantially vertical axis to move toward the occupant.

10. The airbag module of claim 8, wherein the second inflatable chamber pivots along a substantially horizontal axis to move toward the occupant.

11. The airbag module of claim 8, wherein first and second inflatable chambers are fluidly connected through a passage that permits inflation gas to move in a substantially horizontal direction.

12. The airbag module of claim 8, wherein first and second inflatable chambers are fluidly connected through a passage that permits inflation gas to move in a direction substantially downward towards the floor of the vehicle.

13. The airbag module of claim 8, wherein the airbag includes a sail panel that covers the second inflatable chamber and is positioned so that the second inflatable chamber is located between the sail panel and the seat.

14. An airbag module for protecting an occupant of a vehicle seat, the airbag module comprising:
    an inflatable cushion;
    an inflator for providing an inflation gas for the cushion;
    wherein the cushion includes first and second inflatable chambers and is configured to inflate into a position inboard of the vehicle seat;
    wherein the first inflatable chamber is configured to inflate into a position to absorb energy resulting from relative movement of the torso of the occupant in a direction lateral to the longitudinal axis of the vehicle,
    wherein the second inflatable chamber is configured to inflate into a position laterally towards the occupant from the first inflatable chamber to thereby absorb energy resulting from relative movement of the head of the occupant; and
    wherein first inflatable chamber is larger than the second inflatable chamber;
    wherein the first inflatable chamber surrounds the second inflatable chamber;
    wherein the first and second inflatable chambers are fluidly connected by a passage for inflation gas; and
    wherein the perimeter of the second inflatable chamber is not connected to the first inflatable chamber except for along the flow passage.

15. The airbag module of claim 14, wherein the airbag includes a sail panel that covers a side of the second inflatable chamber opposite to the occupant to thereby urge the second inflatable chamber to pivot towards the occupant upon inflation.

16. The airbag module of claim 15, wherein the second inflatable chamber pivots along a substantially vertical axis to move toward the occupant.

17. The airbag module of claim 15, wherein the second inflatable chamber pivots along a substantially horizontal axis to move toward the occupant.

18. The airbag module of claim 14, wherein the passage is configured to direct inflation gas to move in a substantially horizontal direction.

19. The airbag module of claim 14, wherein the passage is configured to direct inflation gas to move in a direction substantially downward towards the floor of the vehicle.

20. The airbag module of claim 14, wherein the airbag includes a non-inflatable region surrounded by the first inflatable chamber.

* * * * *